United States Patent [19]

Mayer

[11] 3,933,039
[45] Jan. 20, 1976

[54] PULSE FLOW DETECTOR
[75] Inventor: Robert Mayer, Ardmore, Pa.
[73] Assignee: Sun Oil Company of Pennsylvania, Philadelphia, Pa.
[22] Filed: Jan. 18, 1974
[21] Appl. No.: 434,534

[52] U.S. Cl. .................................................. 73/204
[51] Int. Cl.[2] .......................................... G01F 1/68
[58] Field of Search ............. 73/195, 204; 340/239

[56] References Cited
UNITED STATES PATENTS

| | | | |
|---|---|---|---|
| 2,828,479 | 3/1958 | Jackson, Jr. | 340/239 |
| 3,148,541 | 9/1964 | Higgins | 73/204 |
| 3,298,518 | 1/1967 | Milholland | 340/239 |
| 3,316,902 | 5/1967 | Winchel et al. | 73/204 |
| 3,577,984 | 5/1971 | Levy | 73/195 |

Primary Examiner—Herbert Goldstein
Attorney, Agent, or Firm—George L. Church; Donald R. Johnson; William C. Roch

[57] ABSTRACT

A circuit for detecting flow pulses in a fluid stream includes a thermistor placed in the fluid stream for sensing changes in the flow rate, an R-C filter in circuit with the thermistor for passing pulses having a specified minimum flow rate change, and a square wave generator for producing an output signal when the filter passes a pulse.

1 Claim, 3 Drawing Figures

PULSE FLOW DETECTOR

BACKGROUND OF THE INVENTION

This application is related to a co-pending application entitled "Pulsed Injection System" filed together herewith.

The invention relates to detecting pulses in fluid flow.

Thermistors, which are temperature variable resistors, are often used to detect the flow of fluids. A thermistor carrying a heat generating current is placed in a fluid stream, which removes the heat at a rate dependent upon the rate of flow of the fluid. A high flow rate will remove a large amount of heat and thus raise the resistance of the thermistor while a low flow rate will remove little heat and conversely lower its resistance. This principle is illustrated in U.S. Pat. No: 2,728,225 by Skibitzke.

One current method of converting thermistor resistance to flow rate is to place the thermistor in the well-known bridge configuration with other resistors. The thermistor's instantaneous resistance is determined by balancing the bridge with a calibrated variable resistor and calculating the resistance from the known values of the other resistors in the bridge. The thermistor resistance is then converted to flow rate by the application of an experimentally-determined conversion factor.

The bridge configuration is sufficient when only the instantaneous flow rate need be determined. There are other situations however in which it is important to know that a change in the rate of flow has occured rather than to know the precise value of the flow rate itself. One example of this situation occurs in the co-pending application entitled "Pulsed Injection System," which may be used to inject odorants into odorless fuel gases.

It is critically important to detect pulses, or rapid changes, in the rate of such fluid flow in such apparatuses as that disclosed in the co-pending application. Odorless fuel gases, such as propane, pose a danger to users in the event of leaks. Users may be overcome by leaking gases without prior warning of the danger. To provide a danger signal, odorants, such as mercaptans, are injected into the gas as it flows from a storage area. The injection process must be continually monitored to provide assurance that the odorant is acutually being added to the gas. In a digital pulse injection system, the optimum monitoring device is a pulse flow detector in the odorant fluid stream.

It is therefore an object of the invention to fill the need for a thermistor flow detector that senses pulses in fluid flow.

SUMMARY OF THE INVENTION

With this and other objects in view, the invention contemplates a thermistor disposable in a fluid stream in circuit with a pulse filter to sense rapid changes in fluid flow and a square wave generator to provide a pulse indicator signal.

DESCRIPTION OF THE DRAWINGS

The invention may be more fully understood with reference to the exemplary embodiments illustrated in the following drawings and subsequent description.

DESCRIPTION OF THE PREFERRED EMBODIMENTS

Figure 1:
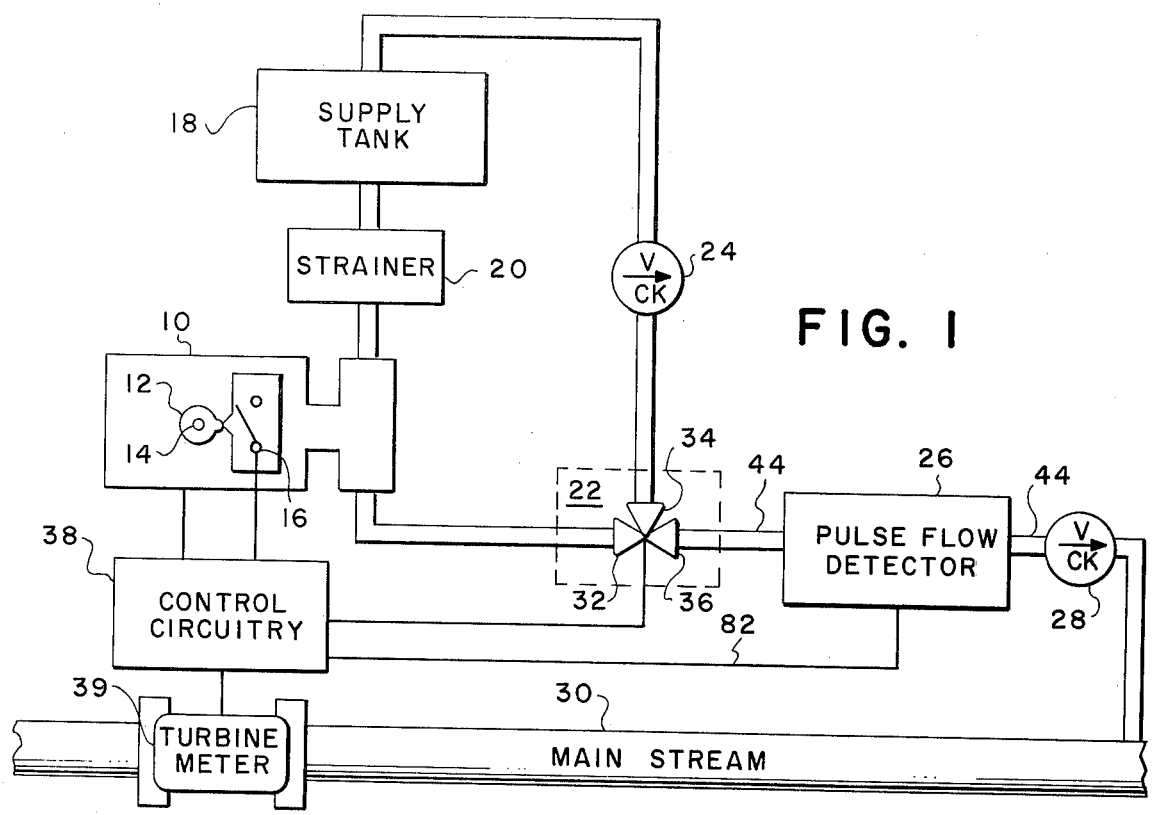
FIG. 1 illustrates a fluid injection system in which the invention may be used.

The invention may be used in a system such as the fluid injection system shown in Figure 1. An injection pump 10, which may be of the reciprocating type with a diaphragm head, has a cam 12 mounted on a shaft 14. A switch 16 is mounted on the side of pump 10 and situated such that it may be engaged by cam 12.

The pump 10 pumps a fluid, e.g. gaseous ordorant, about a circuitous path from a supply tank 19; through a strainer, or filter 20; through a pressure solenoid valve 22; through a pressure relief valve 24; and finally back into tank 18. The fluid may also flow along another path from valve 22; through a pulse flow detector 26; through a check valve 28; and into a main fluid stream 30.

Valve 22 has an inlet port 32, a normally open outlet port 34 and a normally closed outlet port 36. The operation of valve 22 is controlled by circuitry 38, which communicates with pump 10 and switch 16. As the pump 10 operates, cam 12 closes switch 16 on every revolution, sending a pulse signal to digital electronic circuitry 38. A turbine meter 39 generates a pulse signal in proportion to the rate of flow in main stream 30 and also sends it to control circuitry 38. Circuitry 38 generates a control signal after having received both signals, which causes output port 36 of valve 22 to open and outlet port 34 to close. This allows a pulse of fluid from tank 18 to enter main stream 30. Circuitry 38 also communicates with pulse flow detector 26 by means of lead 82 to allow the circuitry to actuate an alarm if it fails to deliver fluid to the main stream 30.

Figure 2:
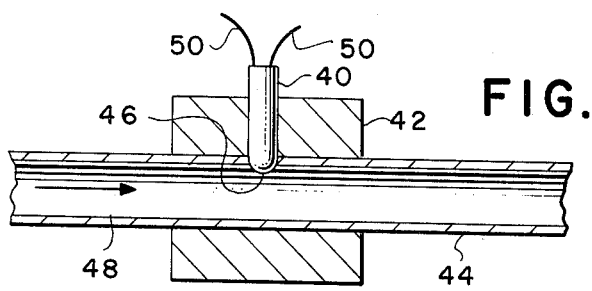
FIG. 2 shows a thermistor flow sensor mounted in a fluid stream.

FIG. 2 shows the sensor portion of the pulse flow detector 26 shown in FIG. 1. A thermistor 40 is mounted in a carrier 42 that is connected to a pipe, or other fluid carrying means 44. A tip portion 46 of thermistor 40 protrudes into the fluid stream, whose flow is designated by arrow 48. Electrical leads 50 provide communication with the associated circuitry shown in FIG. 3.

Figure 3:
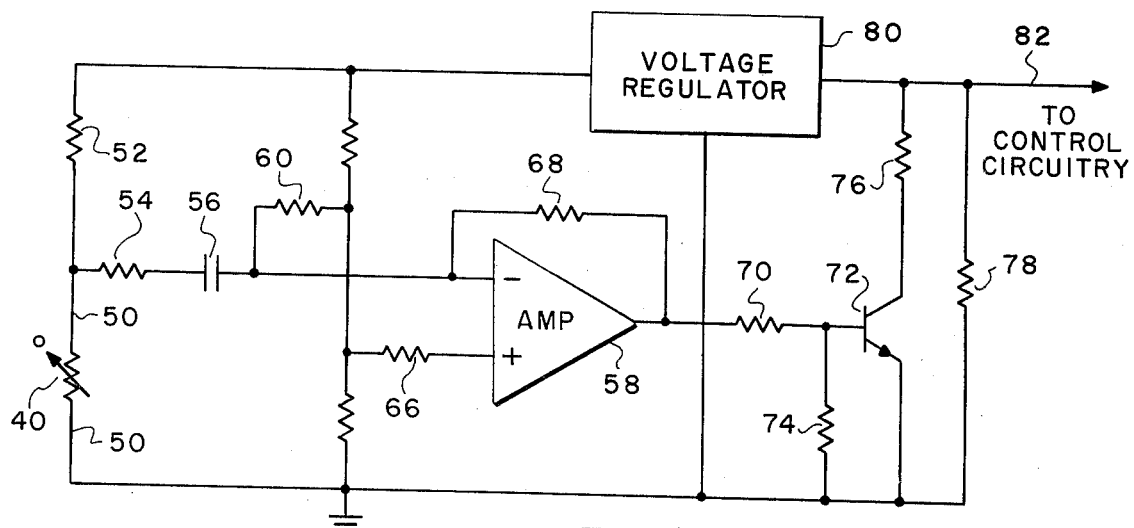
FIG. 3 shows a pulse detector circuit embodying the invention.

In FIG. 3 thermistor 40 may connect in series by means of leads 50 to a current limiting resistor 52. Resistor 52 may also be configured as two discrete resistors to provide standby protection for thermistor 40 should one of the two fail.

Thermistor 40 communicates with a pulse filter comprising resistor 54 and capacitor 56. These two components are selected to pass only pulses whose frequency components correspond to the pulses provided by pump 10 of FIG. 1.

The output of the pulse filter is coupled to an amplifier 58 by means of resistor 60 and enters the amplifier through a resistor 66. A feedback resistor 68 couples this input and output of amplifier 58. The amplification factor of the amplifer is, according to well known principles, the ratio of resistor 68 to the sum of resistor 60 and the paralleled value of resitors 62 and 64.

The output of amplifier 58 passes through a limiting resistor 70 into a transistor 72, which may be of the PNP type, that is biased by a resistor 74. A collector resistor 76 limits the current in the collector-emitter circuit of transistor 72. Transistor 72 is biased and the signal provided by amplifier 58 is sufficiently large to operate in the saturated mode. Transistor 72 thus provides a square wave flow indicator pulse 82 to an output resistor 78 for every input temperature pulse to thermistor 40. The output pulse signal 82 at resistor 78 communicates with control circuitry 38 (Figure 1) to indicate that a pulse of fluid has entered the main stream. To protect the small current levels associated with the thermistor portion of the circuit from the large currents in the indicator square wave portion, a voltage regulator 80, can be inserted in the circuit at the power supply to isolate the two portions.

While particular embodiments of the invention have been shown and described, it is obvious that changes can be made without departing from the true spirit and scope of the invention. It is the intention in the appended claims to cover all such modifications.

What is claimed is:

1. In a fluid injection system having an injection pump which periodically produces fluid pulses in a fluid stream, a fluid pulse flow detector circuit comprising:
   a. a power supply for producing a first power supply voltage;
   b. a voltage regulator coupled to said power supply for producing a second power supply voltage which is relatively low compared to said first power supply voltage;
   c. a thermistor disposed in the fluid stream and coupled to said second power supply voltage with the thermistor being heated by the flow of current through it and cooled by fluid pulses in the fluid stream, and with the cooling resulting in a decreased resistance in the thermistor;
   d. a limiting resistor coupled in series with said thermistor across said second power supply voltage, said limiting resistor functioning to limit the current through the thermistor, and the limiting resistor and thermistor functioning as a voltage divider network with the voltage across the thermistor varying with its resistance in dependence upon temperature, whereby each fluid pulse which cools the thermistor results in a voltage pulse across the thermistor;
   e. a pulse filter means, coupled to the output of said thermistor and including a series coupled resistor and capacitor, for passing only pulses having frequency components corresponding to the pulses provided by the injection pump;
   f. a feedback amplifier, coupled to the output of said pulse filter means, for amplifying the output of said pulse filter;
   g. a series coupled limiting resistor and biasing resistor coupled to the output of said amplifier; and
   h. a transistor means, coupled to said first power supply voltage and further coupled to receive the voltage across said biasing resistor as an input, for being driven to saturation by each voltage pulse across the biasing resistor to produce a squarewave pulse output across an output load resistor in response to each voltage pulse across the biasing resistor, whereby the output of the circuit is a squarewave pulse for each fluid pulse produced by the injection pump.

* * * * *